United States Patent [19]

Wilkins

[11] 4,453,627
[45] Jun. 12, 1984

[54] ACCUMULATOR CONVEYOR

[75] Inventor: John J. Wilkins, Union Township, County of Clermont, Ohio

[73] Assignee: The E. W. Buschman Co., Cincinnati, Ohio

[21] Appl. No.: 285,225

[22] Filed: Jul. 20, 1981

Related U.S. Application Data

[63] Continuation of Ser. No. 119,817, Feb. 8, 1980, abandoned.

[51] Int. Cl.³ .............................................. B65G 13/06
[52] U.S. Cl. ..................................... 198/781; 198/783
[58] Field of Search ......................... 198/781, 789, 783

[56] References Cited

U.S. PATENT DOCUMENTS 3,768,630 10/1973 Inwood et al. ...................... 198/781
4,108,303 8/1978 Vogt et al. .......................... 198/781
4,109,783 8/1978 Vogt .................................... 198/781
4,264,004 4/1981 Harwick ............................. 198/781

Primary Examiner—Joseph E. Valenza
Assistant Examiner—Jonathan D. Holmes
Attorney, Agent, or Firm—Biebel, French & Nauman

[57] ABSTRACT

A live roller accumulator conveyor has a plurality of zones between its inlet and discharge ends which are arranged in groups. Each zone has a sensor which reacts to the presence of an article therein by deactuating the drive for the adjacent upstream zone in order to provide for accumulation of multiple articles on the conveyor. When the accumulated articles are to be discharged, however, these controls are overriden so that when the zone immediately downstream from a group of zones is cleared, the drives for all of the zones of the next upstream group are actuated simultaneously so that all of the group of articles accumulated therein advance in unison.

8 Claims, 17 Drawing Figures

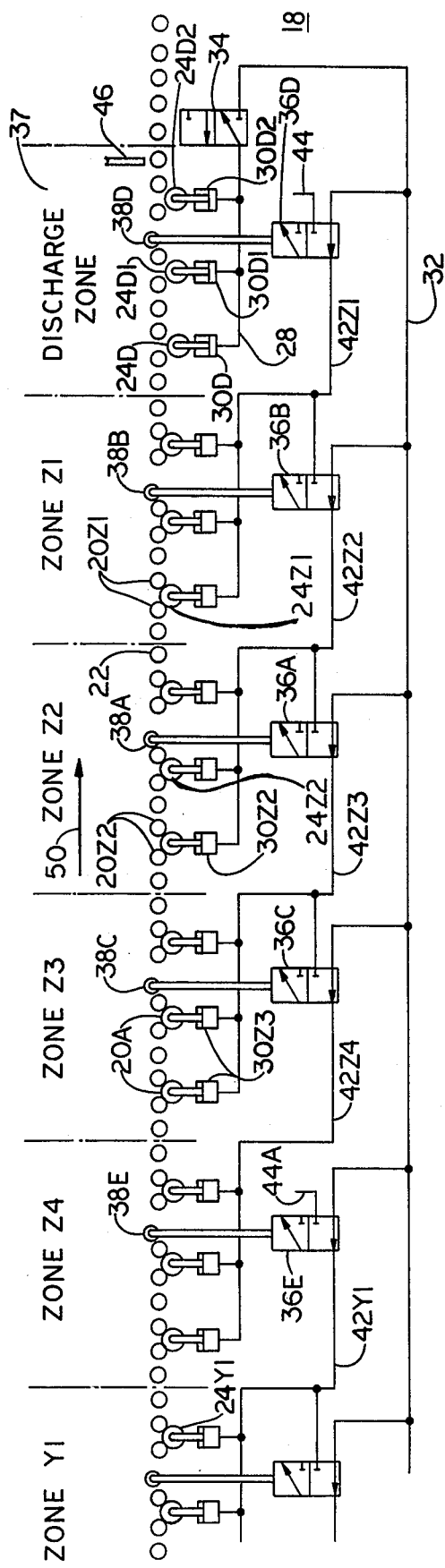
FIG. I
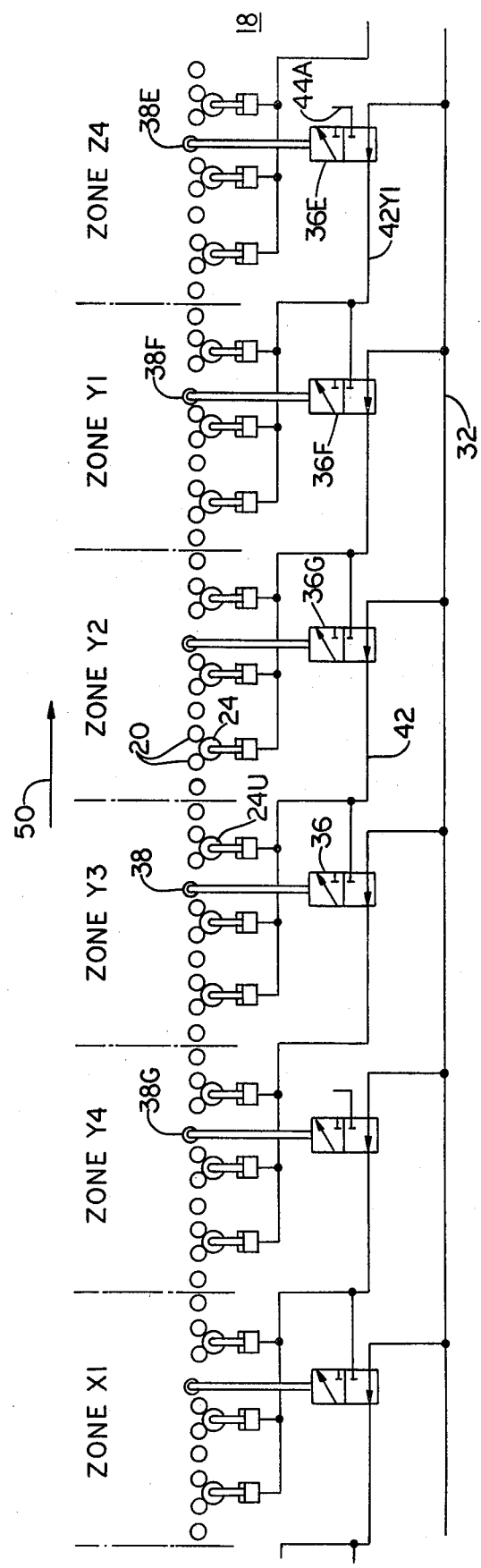
FIG. IA

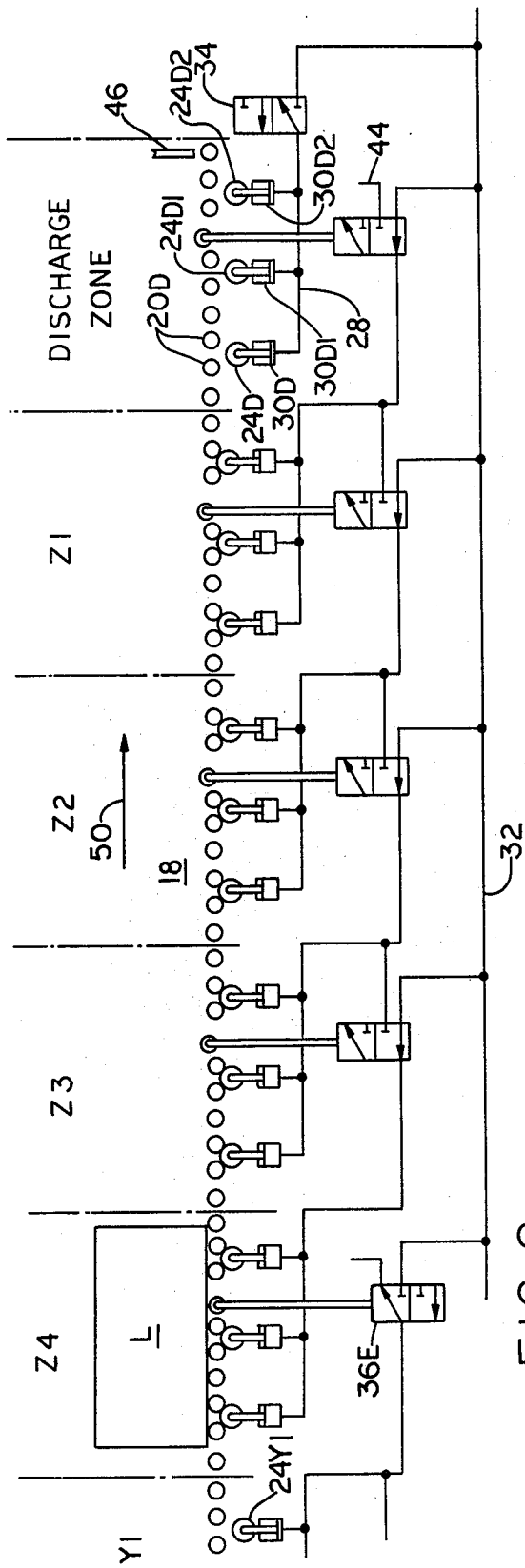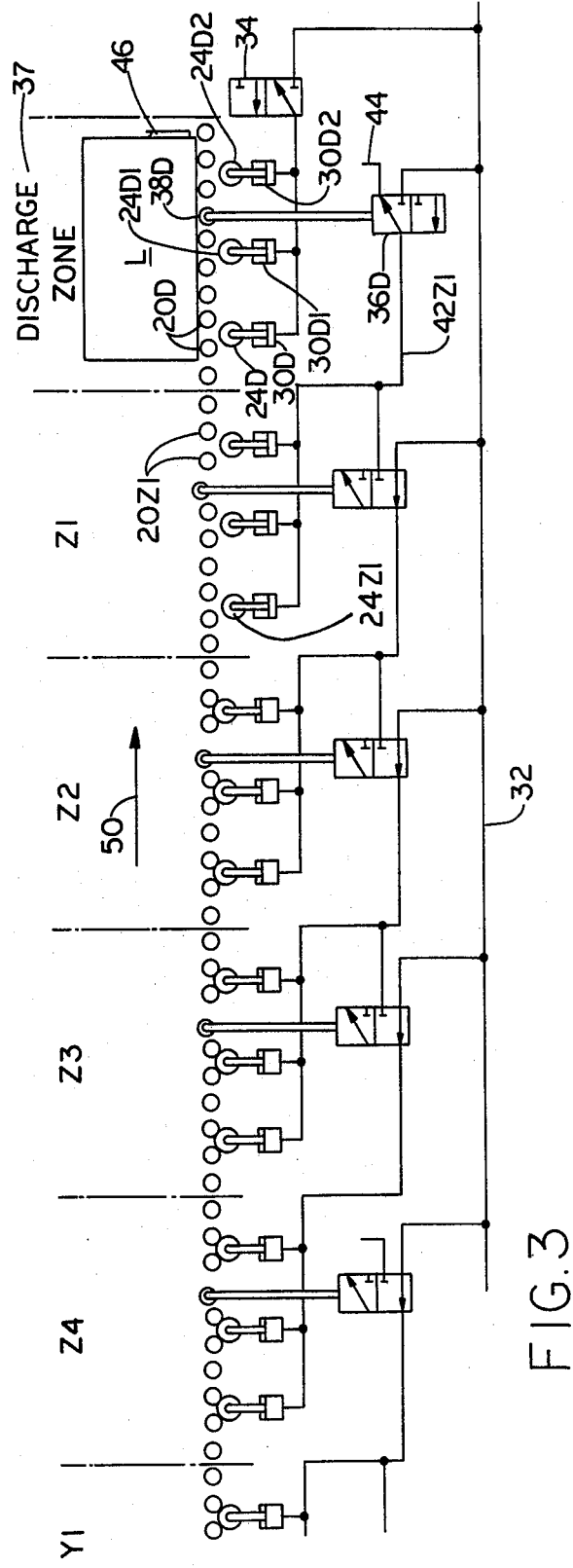

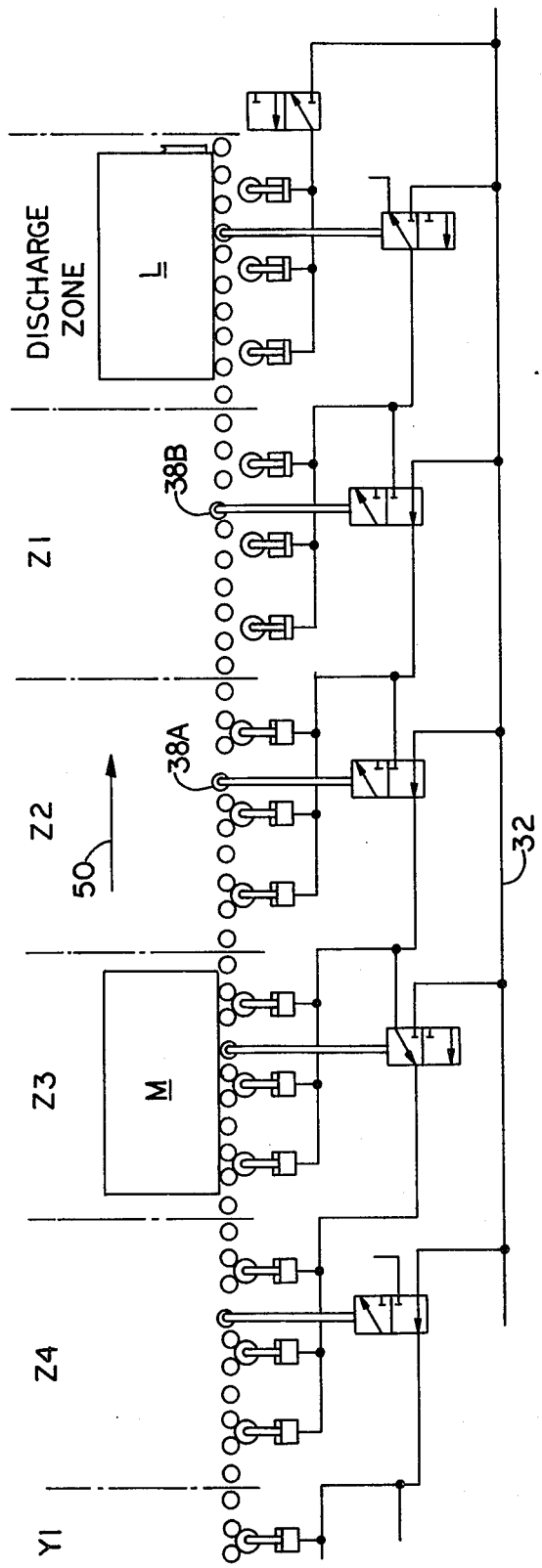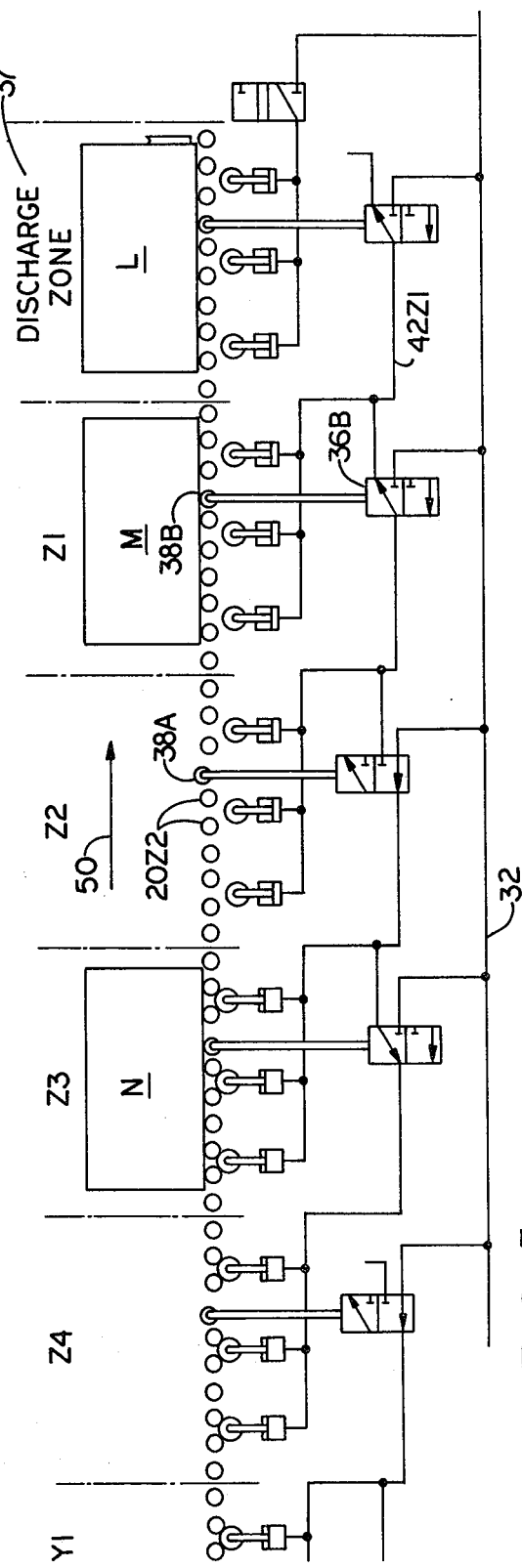
FIG. 4
FIG. 5

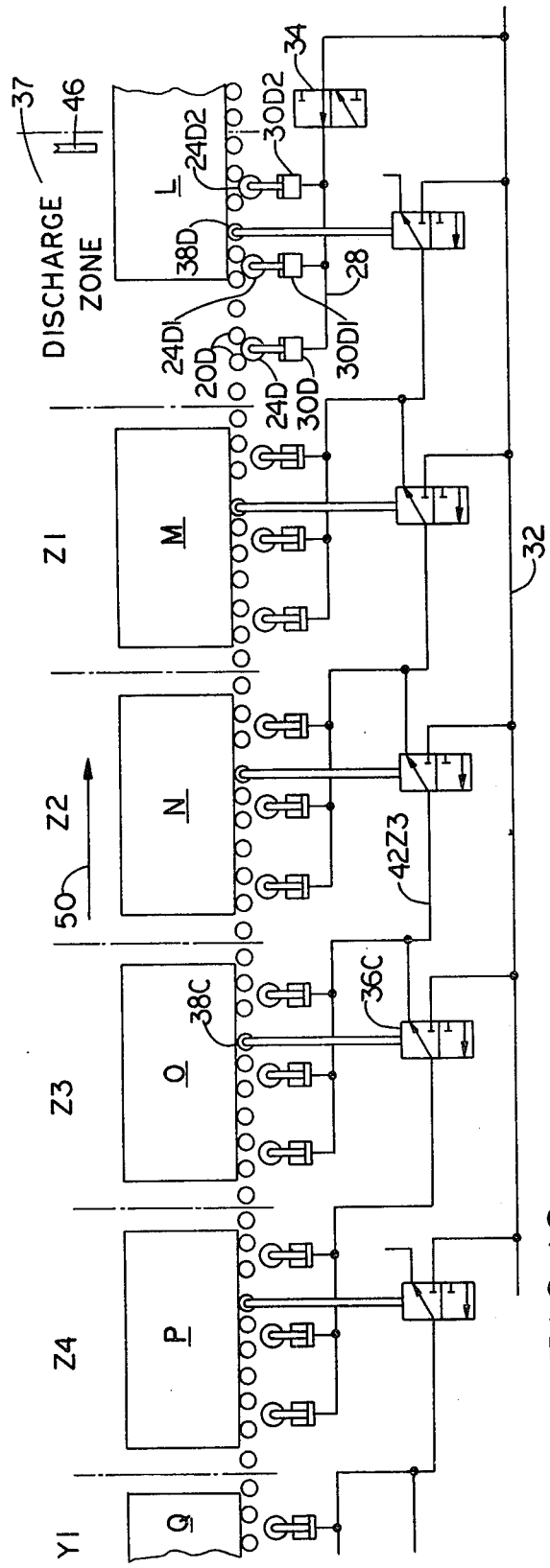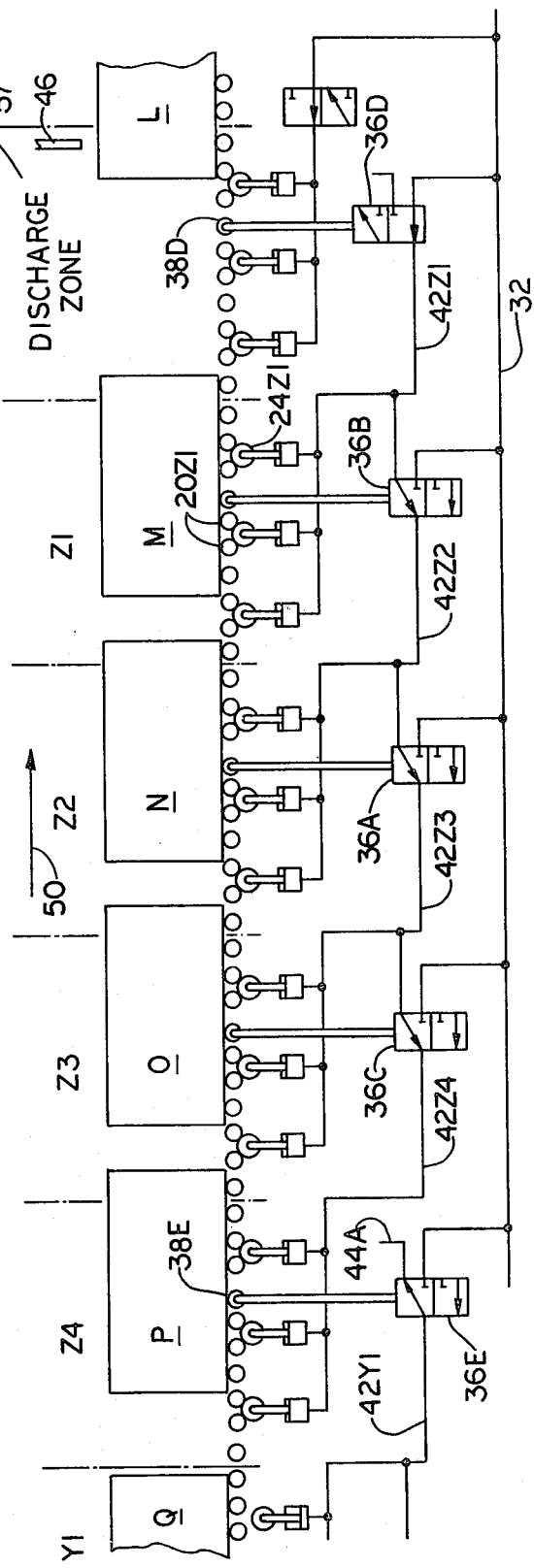

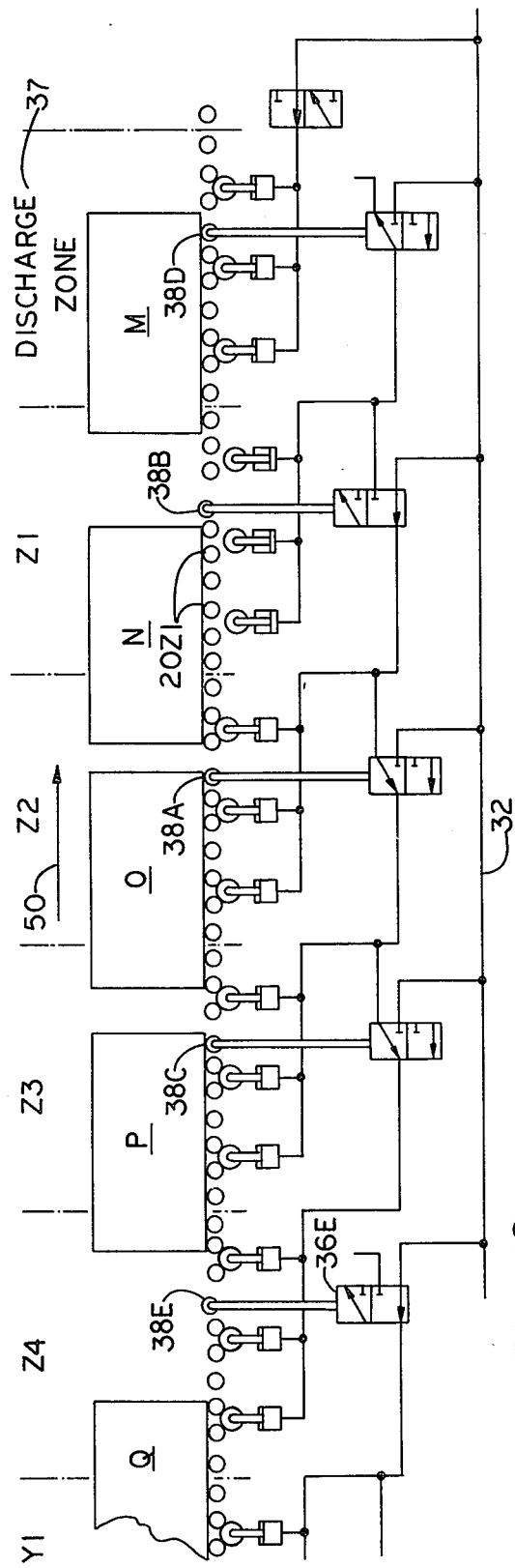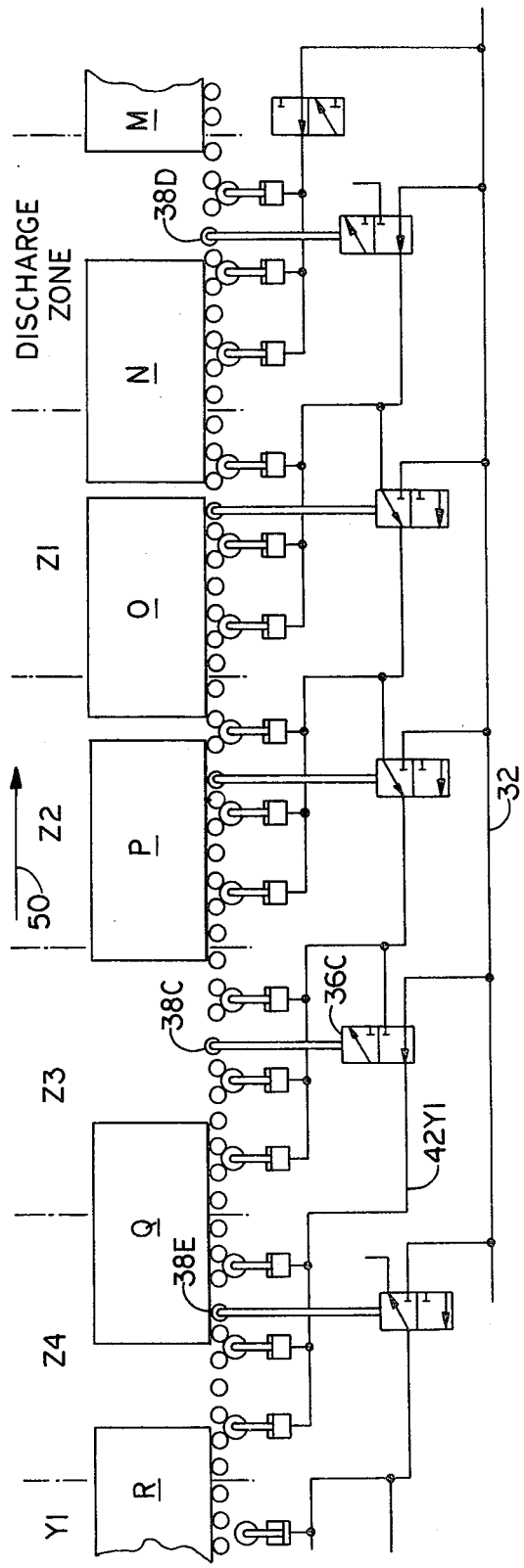
FIG.12
FIG.13

ACCUMULATOR CONVEYOR

RELATED APPLICATION

This application is a continuation of application Ser. No. 119,817, filed Feb. 8, 1980, and now abandoned.

BACKGROUND OF THE INVENTION

A live roller accumulator conveyor commonly includes a plurality of zones along the length of the conveyor from the infeed to the discharge end thereof, with each zone including powered rollers adapted to receive an article from an immediately upstream zone and deliver it to an immediately downstream zone. A sensor associated with each zone responds, under normal conditions, to the presence of an article stopped therein by rendering inoperative the powered rollers in the zone immediately upstream therefrom.

In this manner, articles can back up from the discharge end toward the infeed end of the conveyor when a lead article is stopped in the discharge zone. The zones are successively deadened, i.e., the powered rollers therein are successively rendered inoperative, from the discharge end to the infeed end as successive articles are stopped in successive zones upstream from the discharge end. Once the article at the discharge end is removed, the zones are reactivated to move the articles along the conveyor again. Such conveyors, wherein the zones can be activated in sequence, are shown in Vogt et al U.S. Pat. No. 4,108,303 and Vogt U.S. Pat. No. 4,109,783.

When it is desired to discharge accumulated articles from a conveyor as shown in the Vogt et al patent, each successive article must vacate the particular zone wherein it had stopped before the article stopped in the next zone upstream therefrom will begin to move. Thus although a plurality of articles may be moving at the same time, adjacent articles will be separated by a distance substantially equal to the length of a zone. The purpose of the present invention is to provide an accumulator conveyor from which accumulated articles can be discharged in groups, with minimal spacing, if any, between the adjacent articles in each group.

SUMMARY OF THE INVENTION

This invention provides an accumulator conveyor in which, when an article stopped at the discharge end has been removed, all of the zones in a group of consecutive zones adjacent the discharge end are activated in unison so that articles in all the zones of the group are caused to advance in unison and without waiting for the clearance of individual downstream zones. In a preferred embodiment of the invention, such an accumulator conveyor is provided with fluid operated controls which have valves arranged to cause actuation of zones of an entire group when the upstream zone of the adjacent downstream group is cleared.

Briefly, this invention provides an accumulator conveyor which includes a plurality of zones arranged in groups. Each zone includes at least one drive element, and a sensor located in each zone is effective, when that zone is unoccupied by an article, to actuate the drive unit for the zone immediately upstream therefrom, and vice versa.

In order to accomplish the objective of accelerated discharge of accumulated articles, the invention provides secondary controls—in the form of three-way valves and multiple pressure air lines—which interconnect selected numbers of successive zones into groups. When the accumulated articles are to be discharged, these secondary controls override the sensor-operated controls in such manner that even though all zones in the group may be occupied by articles, the drive rollers for the entire group of zones will be driven to cause all articles accumulated in the group of zones to start in unison toward the discharge end of the conveyor. Similarly as soon as the sensor in the most upstream zone of the group is released by a departing article, all zones in the adjacent upstream group are activated in unison, and so forth until all accumulated articles have been set in motion.

BRIEF DESCRIPTION OF THE DRAWINGS

FIG. 1 is a schematic view of the discharge end portion of a conveyor constructed in accordance with an embodiment of this invention, the conveyor being free of articles;

FIG. 1A is a schematic view of a portion of the conveyor upstream of the discharge end portion;

FIG. 2 is a schematic view of the discharge end portion of the conveyor as a first article enters the discharge end portion;

FIG. 3 is a schematic view of the discharge end portion with a first article engaging a stop at a discharge end of the conveyor;

FIG. 4 is a schematic view of the discharge end portion with the first article engaging the stop and a second article approaching the first article;

FIG. 5 is a schematic view of the discharge end portion with the first two articles stopped at the discharge end and a third article approaching the first two articles;

FIG. 10 is a schematic view of the discharge end portion with the first article starting to exit the conveyor;

FIG. 11 is a schematic view of the discharge end portion with the first article having substantially completed its exit and with the next four articles moving in unison toward exit;

FIG. 12 is a schematic view of the discharge end portion after the first article has exited and showing the next four articles continuing to move toward exit and a sixth article started in motion;

FIG. 13 is a schematic view of the discharge end portion showing a second article exiting and other articles approaching the discharge end of the conveyor.

DETAILED DESCRIPTION OF THE PREFERRED EMBODIMENT

The accumulator conveyor 18 includes a plurality of drive rollers 20 and idler rollers 22. Friction drive wheels 24 are each arranged to engage an associated pair of the drive rollers when in a raised position as indicated at 24U (FIG. 1A). Each friction drive wheel is disengaged from the associated drive rollers when in a lowered or retracted position as indicated at 24Y1 (FIG. 2). When air under pressure is introduced into the line 28, it acts in fluid pressure actuators 30D, 30D1 and 30D2 (FIG. 1) to raise friction wheels 24D, 24D1 and 24D2. The friction wheels are driven by an appropriate drive mechanism shown in FIGS. 14–16.

Figure 14:
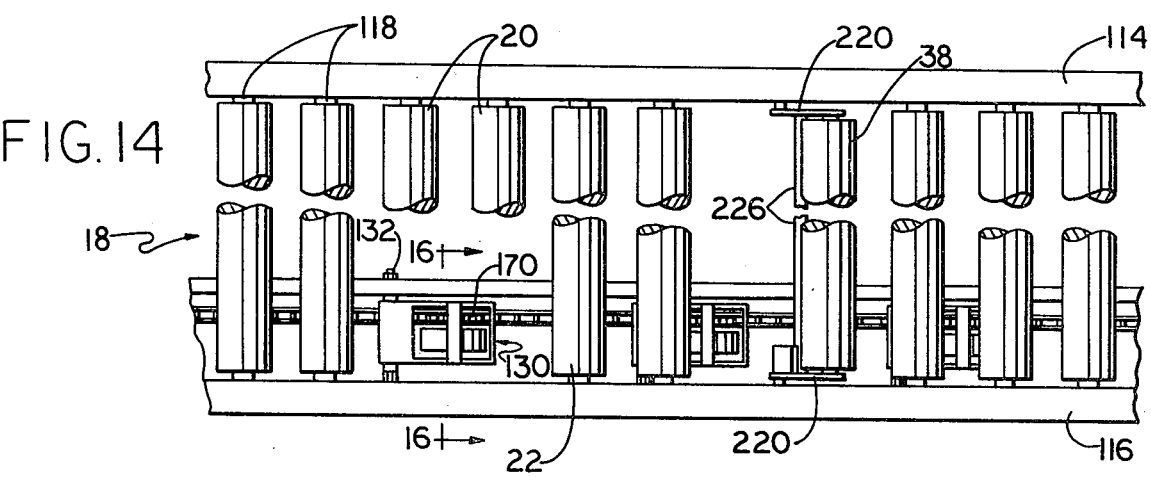
FIG. 14 is a fragmentary plan view of the conveyor.
Figure 15:
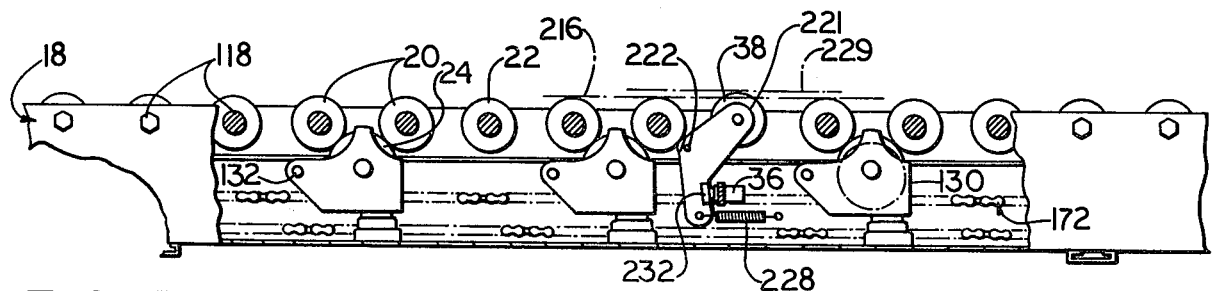
FIG. 15 is a fragmentary view in side elevation of the conveyor with parts being broken away to show details of construction.
Figure 16:
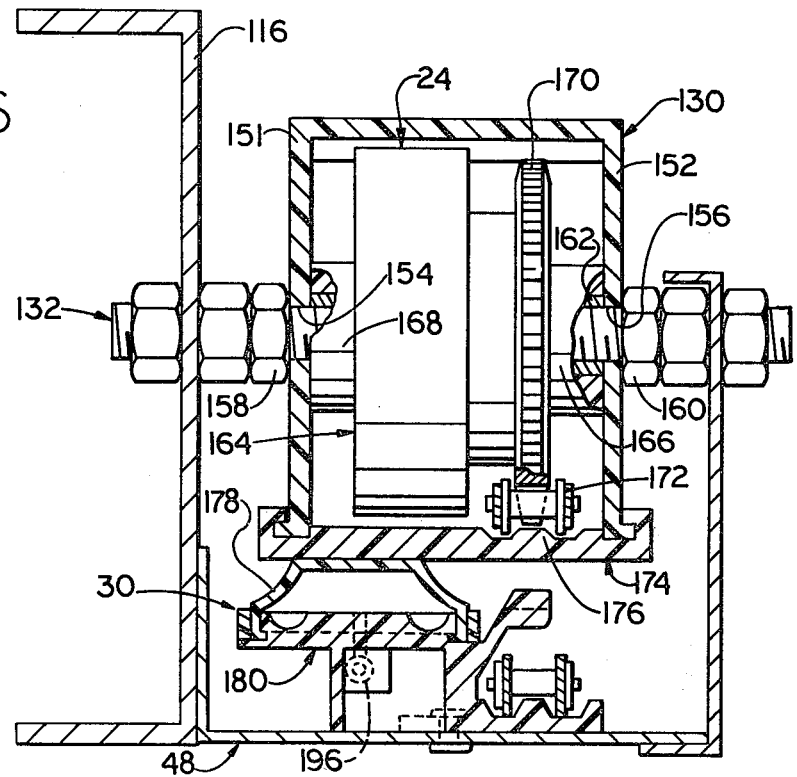
FIG. 16 is a view in section taken on an enlarged scale on the line 16—16 in FIG. 14.

Details of the conveyor and the assemblies which include the friction drive wheels 24 are shown in FIGS. 14–16. The conveyor includes side rails 114 and 116 supported by appropriate frame means, not shown. Appropriate cross bars, not shown, hold the side rails 114 and 116 in spaced parallel relation. The drive rollers 20 and the idler rollers 22 are rotatably mounted on shafts 118, which span the side rails 114 and 116.

Each of the friction drive wheels 24 is rotatably mounted in a housing 130 pivotally mounted on a shaft 132 extending between the side rail 116 and a frame and guard member 134 which is connected by an angle-shaped member 48 with the side rail 116. The housing 130 includes side walls 151 and 152, which are provided with openings 154 and 156, respectively, in which a bearing support bolt 158 is mounted. A nut 160, threaded on the bolt 158, holds the bolt 158 in place. A bearing sleeve 162 is mounted on the bolt 158 between the side walls 151 and 152. A friction wheel assembly 164 is rotatably mounted on the sleeve 162.

The friction wheel assembly 164 includes a hollow body 166 having a central portion 168, which receives the bearing sleeve 162, and a sprocket portion 170 integral with the central portion 168. The friction drive wheel 24 portion of the assembly is a ring of rubber-like material mounted on the body 166, and its perpheral face has driving engagement with associated drive rollers.

The housing 130 carries a removable bottom plate 174, which is slidably mounted on lower edge portions of the side walls 151 and 152. A chain guide rib 176 on the bottom plate 174 underlies the sprocket portion 170 and serves to guide an upper or drive chain course 172 into driving engagement with the sprocket portion 170. The bottom plate 174 can be removed to free the drive chain course from the sprocket portion 170.

The housing 130 is raised by a diaphragm 178 of generally inverted cup shape, which is a part of the fluid pressure actuator 30 and is mounted on a seat portion 180 of a plastic molding which is mounted on the member 48 and includes a chain guide portion 182 for the lower or return run 184 of the drive chain. Air under pressure can be introduced into the interior of the diaphragm 178 through a port 196 to cause the diaphragm 178 to assume the extended position shown in FIG. 16.

A sensor roller 38 (FIGS. 14 and 15) is rotatably mounted in idler fashion between opposed bell crank arms 220. The sensor roller 38 is mounted at the upper ends 221 of the bell crank arms 220, which are pivotally mounted to, but spaced from, the side rails 114 and 116 on a pivot axis 222. A bar 226 is welded to and spans the bell crank arms 220 to cause them to move as a unit. A tension spring 228 urges the sensor roller 38 into a sensing plane 229 with no articles on the conveyor. The sensing plane 229 is elevated above a conveying plane 216 defined by the drive rollers 20 and the idler rollers 22. A wear strip 232 is mounted on one of the bell crank arms 220 to cooperate with a sensor operated valve 36.

The structure described to this point is similar to that shown in the aforementioned U.S. Pat. Nos. 4,109,783 and 4,108,303, and in Vogt et al application Ser. No. 914,851, filed June 12, 1978. Air under pressure is supplied through a line 32 (FIGS. 1–13). The air supply to the various fluid pressure actuators is controlled by a discharge valve 37 and sensor operated valves 36 which direct the air to air lines 42.

The conveyor is divided into a plurality of zones, and these zones are divided into groups. At the discharge end of the conveyor is a discharge zone 37. Upstream of the discharge zone is a series of zones indicated Z1, Z2, Z3 and Z4 which are interconnected into the Z group of zones by the successive valves 36B, 36A and 36C, which cause pressure air to be supplied to the drive assembly in zones Z2, Z3 and Z4 irrespective of the positions of sensors 38B, 38A and 38C whenever sensor 38D is released.

Upstream of the last group of zones is a next or Y group of zones (FIG. 1A) indicated Y1, Y2, Y3 and Y4 and similarly interconnected by valves 36F, 36G and 36H under the control of valve 36E. Further upstream are additional similar groups of zones, not shown in detail except for zone X1 in FIG. 1A. The flow of air to the fluid pressure rams in each zone is controlled by a sensor 38 in the zone immediately downstream therefrom.

Each sensor 38 actuates one of the series of sensor operated valves 36. Thus the sensor 38A located in the zone Z2 immediately downstream from the zone Z3 actuates a valve 36A which controls flow of air to fluid pressure actuators 30Z3 in the zone Z3. The valve 36A has a normal position shown in FIG. 1 in which the air line 32 is connected to a line 42Z3. The line 42Z3, in turn, is connected to associated actuators rams 30Z3 to raise friction wheels 20A to drive the associated drive rollers of zone Z3.

Valve 36D associated with the zone Z1, which is the downstream zone of the Z group of zones, normally is in the position shown in FIG. 1 in which air under pressure from the line 32 is directed through a line 42Z1 to raise friction wheels 24Z1 into driving engagement with drive rollers 20Z1 in zone Z1. When an article L is stopped in the discharge zone 37 and the sensor 38D is depressed as shown in FIG. 3, the valve 36D is in its other position, and the line 42Z1 is connected to an exhaust line 44 so that the friction wheels 24Z1 of the zone Z1 are lowered and the drive rollers 20Z1 are released. A mechanical stop 46 can stop article L in the discharge zone 37. Thus the drive rollers in the zone Z1 are inactive when the article L is stopped in the discharge zone 37.

The sensor 38B located in the zone Z1 is depressed by an article in zone Z1, as indicated in FIG. 5, where an article M is shown in the zone Z1. The sensor 38B actuates a valve 36B. When the valve 36B is in its normal position, as shown in FIG. 1, the air pressure line 32 is connected to a line 42Z2. The line 42Z2, in turn, is connected to actuators 30Z2 in the zone Z2 so that when there is air under pressure in the line 42Z2, friction wheels 42Z2 in the zone Z2 are raised to drive associated drive rollers 20Z2 in the zone Z2.

When there are articles in zone Z1 and in the discharge zone 37, as shown in FIG. 5, the valve 36B is in its other position, and the drive rollers in the zone Z2 are inactive. However, the line 42Z1 is connected to the valve 36B, and when the discharge zone 37 is vacated as shown in FIG. 11 and the sensor 38D is in its raised or normal position, air under pressure is introduced into the line 42Z2 to actuate the drive rollers in the zone Z2 even though an article M is stopped and engaging the sensor 38B in the zone Z1.

In similar fashion, the sensor 38A located in the zone Z2 can be depressed by an article N (FIG. 6) in the zone Z2 to actuate the valve 36A controlling flow of air to the line 42Z3 and actuation of the drive rollers 20Z3 in the zone Z3. The sensor 38C located in the zone Z3 can be depressed by an article O (FIG. 7) in the zone Z3 to actuate the valve 36C controlling flow of air to a line 42Z4 and actuation of drive rollers 20Z4 in the zone Z4. The line 42Z3 is connected to the valve 36C, and when the sensor 38D in the discharge zone 37 is released as shown in FIG. 11, air under pressure from the line 32 is directed through the valves 36D, 36B, 36A and 36C to the lines 42Z1, 42Z2, 42Z3 and 42Z4 to cause actuation of the drive rollers in zones Z1, Z2, Z3 and Z4 as shown in FIG. 11 and cause advance of articles in all of the zones of the Z group of zones.

The sensor 38E, which is located in the zone Z4, actuates a valve 36E. When the valve 36E is in its normal position, as shown in FIG. 1A, air under pressure is directed from the line 32 to a line 42Y1. When the sensor 38E is moved to its lowered position by an article P in the zone Z4, as shown in FIG. 11, the valve 36E is in its other position, and the line 42Y1 is connected to an exhaust line 44A.

The line 42Y1 is connected to a valve 36F (FIG. 1A) which is actuated by a sensor 38F located in the zone Y1. The valve 36E and valves 36G, 36 and 36F associated with the Y group of zones are interconnected in the same manner as the valves of the Z group so that when the sensor 38E is released, air under pressure is directed through the valves 36E, 36F, 36G and 36 to cause actuation of the drive rollers in all of the Y group of zones.

In similar fashion, sensor operated valves of an X group of zones, only one of which is shown, and additional groups of zones further upstream, can be similarly connected so that when the sensor operated valve controlling actuation of drive rollers of the most upstream zone in a group of zones is in its normal position, air under pressure is directed to all zones in the next upstream group of zones. Thus when a sensor located in a zone immediately downstream of a group of zones is released, all zones in that group of zones are actuated or made live.

Operation of the accumulator conveyor 18 will now be described with particular reference to FIGS. 2 through 13. Referring first to FIG. 2, the first article L travels along the conveyor 18 in the director of the arrow until it reaches the mechanical stop 46, as shown in FIG. 3. When that stop 46 is in place and the discharge valve 34 is in the position shown in FIGS. 2 and 3, actuators 30D, 30D1 and 30D2 are depressurized, and the friction wheels 24D, 24D1 and 24D2 are lowered so that drive rollers 20D in the discharge zone 37 are inactive.

Figure 6:
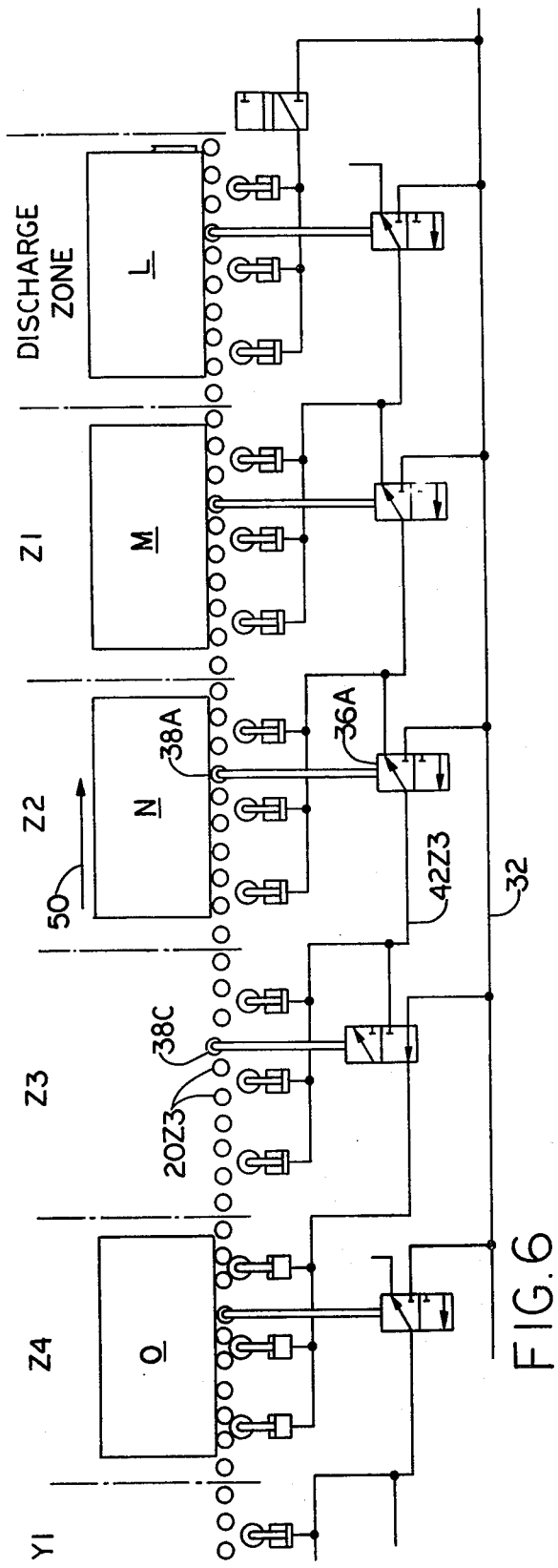
FIG. 6 is a schematic view of the discharge end portion with the first three articles stopped and a fourth article approaching the first three articles.
Figure 7:
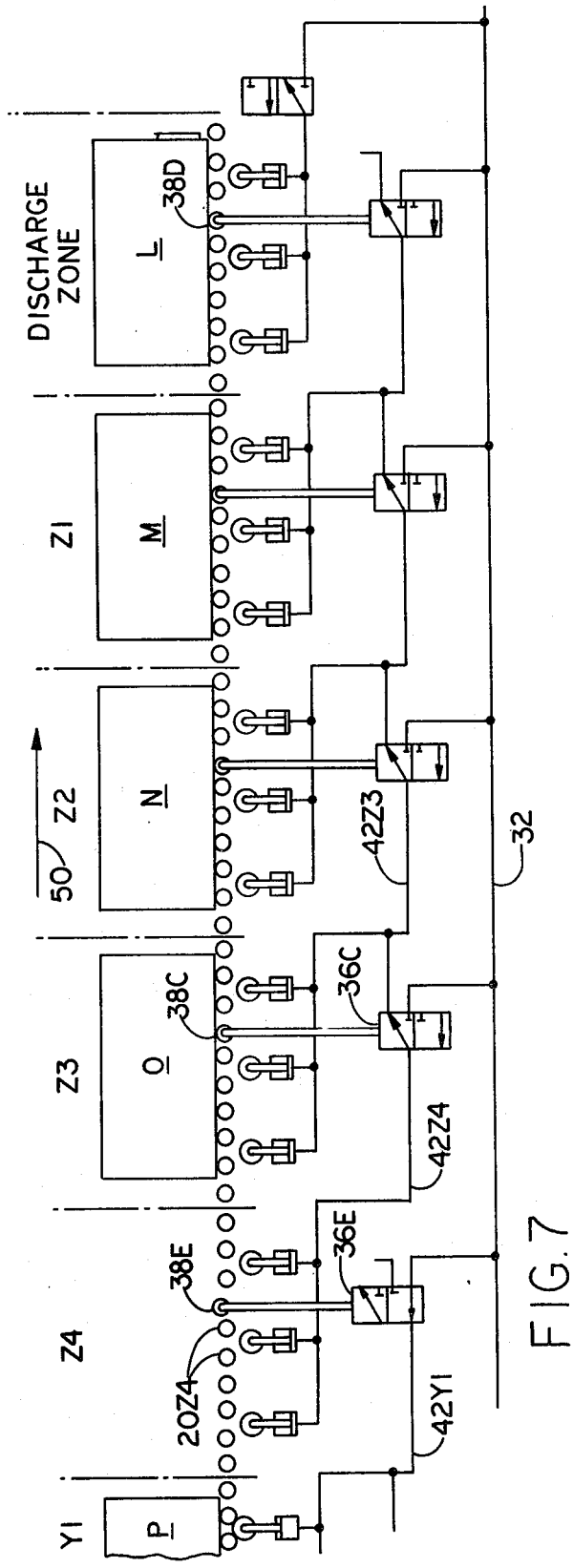
FIG. 7 is a schematic view of the discharge end portion with four articles stopped and a fifth article approaching the first four articles.
Figure 8:
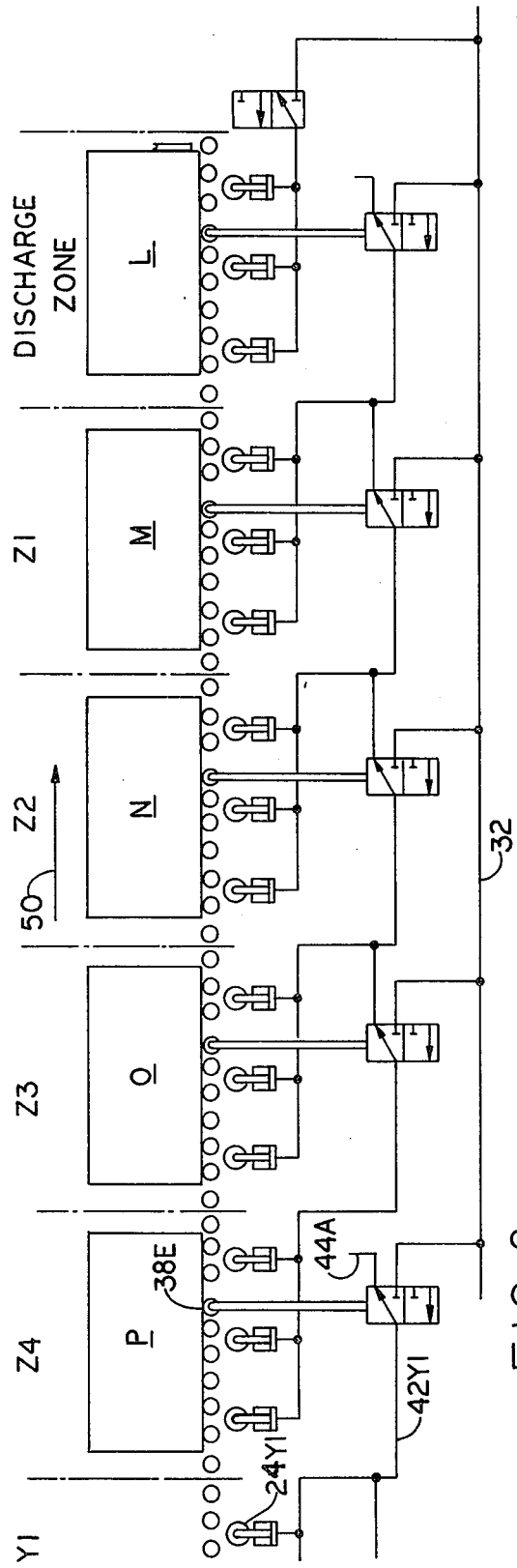
FIG. 8 is a schematic view of the discharge end portion with the first five articles stopped.

When the first article L is in the discharge zone 37, the sensor 38D is depressed, and the valve 36D is in the FIG. 3 position so that the drive rollers 20Z1 are also inactive. However, drive rollers in zones upstream of the zone Z1 remain active so that the next article M can be advanced as shown in FIG. 4 until the article M reaches the zone Z1, as shown in FIG. 5. When the article M is in the zone Z1, the drive rollers 20Z2 in the zone Z2 are inactive so that when a next article N reaches the zone Z2, the article N stops in the zone Z2 as shown in FIG. 6. Additional articles O and P stop in the zones Z3 and Z4, respectively, as shown in FIGS. 7 and 8.

Figure 9:
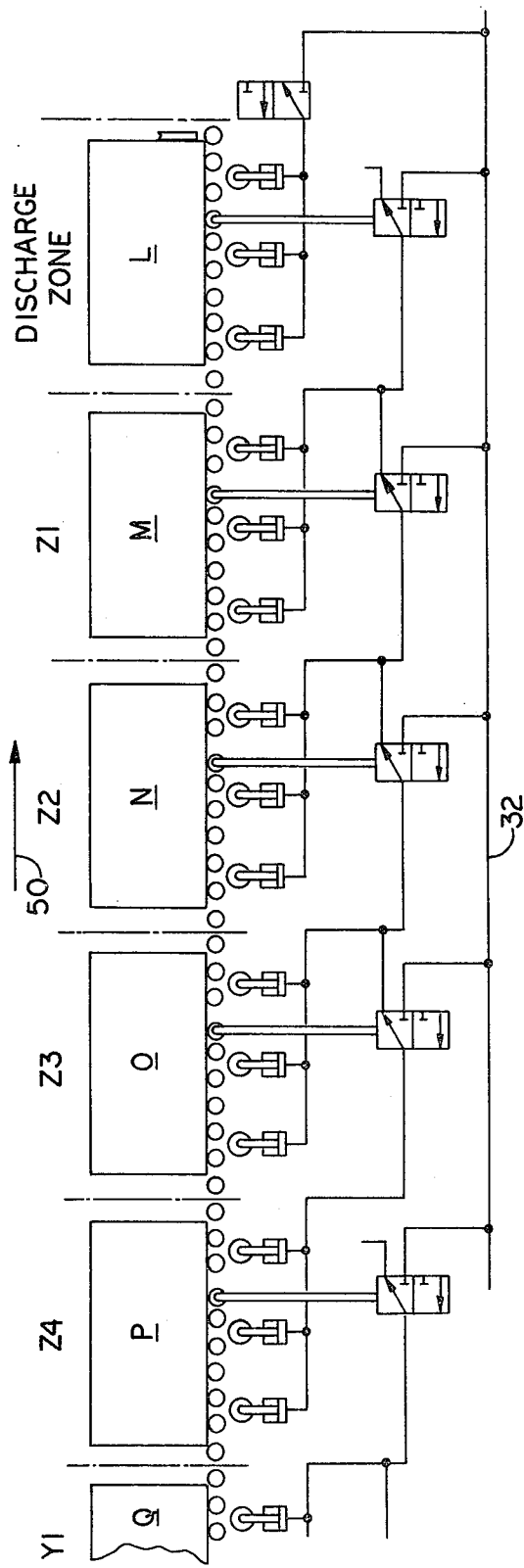
FIG. 9 is a schematic view of the discharge end portion with six articles stopped.

When the article P has reached the zone Z4, drive rollers of all of the zones of the Z group of zones are deactivated, and in addition, the sensor 38E in the zone Z4 is depressed to connect the line 42Y1 to a relief line 44A so that friction wheels 24Y1 in the zone Y1, the downstream zone of the Y group of zones, are lowered and drive rollers in the zone Y1 are deactivated. A next article Q therefore stops in the zone Y1, as shown in FIG. 9 and similarly additional articles, not shown, will stop in zones further upstream.

When the mechanical stop 46 is raised and the discharge valve 34 is moved to its other position, as shown in FIG. 10, air under pressure from the air line 32 passes through the valve 34 and the line 28 to the actuators 30D, 30D1 and 30D2 to raise the friction wheels 24D, 24D1 and 24D2 into driving engagement with the drive rollers 20D of the discharge zone 37 to advance the article L from the discharge zone 37.

When the article L clears the sensor 38D of the discharge zone 37, the valve 36D rises to its FIG. 11 position, and air under pressure is directed through the valve 36D and the line 42Z1 to cause raising of the friction wheels 24Z1 of the zone Z1 and actuation of the drive rollers 20Z1 of the zone Z1. Further, although the sensors 38B, 38A and 38C in zones Z1, Z2 and Z3 remain lowered, they are overridden by the secondary control circuits through the valve 36D and lines 42Z1, 42Z2, 42Z3 and 42Z4, which supply air to the actuators for zones Z2, Z3 and Z4 to cause actuation of the drive rollers of the zones Z2, Z3 and Z4 so that the articles M, N, O and P start to advance as a group as the article L exits from the accumulator conveyor 18.

When the article M reaches the sensor 38D in the discharge zone 37, as shown in FIG. 12, the valve 36D is again depressed, and the drive rollers 20Z1 in the zone Z1 are rendered inactive until the article M has cleared the discharge zone 37. However, the drive rollers in the zones Z2, Z3 and Z4 remain active until the sensors 36B in zone Z1 is depressed by article N. The articles O and P therefore continue to advance at the same speed as article M, and if the article N should decelerate as it coasts in zone Z1, the article O will tend to move against it and move it forward at the same speed until it depresses sensor 36B and thereby causes deactuation of the drives in zones Z2, Z3 and Z4.

As soon as the article M clears the sensor 38D, as shown in FIG. 13, the drive rollers in all of the Z group of zones are reactuated, and the articles N, O and P continue to advance as the article M is discharged. In addition, as soon as the article P clears the sensor 38E of the zone Z4, as shown in FIG. 12, the sensor 38E and the valve 36E rise to the FIG. 12 position so that the drive rollers of the Y group of zones (zones Y1, Y2, Y3 and Y4) are actuated, and articles in the Y group of zones are advanced in the manner illustrated by the article Q and R are shown in FIG. 13.

When articles in the zone Y4 (FIG. 1A) clear the sensor 38G in the zone Y4, drive rollers of an X group of zones (only one of which is shown) are similarly actuated. Thus when the first article is released and advances from the accumulator conveyor 18, the remaining accumulated articles are discharged in groups without requiring a wait until there is a vacant zone downstream any of a particular zone before an article can exit that zone, except that a space approximately equal to a zone is maintained between successive group of packages.

The accumulator conveyor illustrated in the drawings and described above is subject to structural modification without departing from the spirit and scope of the appended claims.

What is claimed is:

1. In a live roller accumulator conveyor including a frame and a plurality of rollers rotatably mounted on said frame and defining a plurality of successive accumulator zones, the combination of
    (a) drive means for each of said zones including at least one power transfer device mounted on said frame for movement between a driving position with respect to at least one roller in said zone and a non-driving position,
    (b) shifting means for each of said power transfer devices normally maintaining said device in the driving position thereof,
    (c) sensor means for each said zone for sensing the presence of an article in said zone,
    (d) primary control means connecting said sensor means for each said zone with said shifting means for the adjacent zone upstream thereof and responsive to activation of the associated said sensor means by an article in said zone to move the associated said power transfer device to non-driving position and thereby to respond to the presence of an article stopped in a downstream one of said zones by causing articles to accumulate in successive zones upstream from said one zone, and
    (e) a plurality of secondary control means each interconnecting said primary control means for a group of successive said zones and thereby defining a corresponding plurality of consecutive said zone groups,
    (f) each said secondary control means including means operative to override the resulting group of said primary control means in response to movement of the stopped article from the immediately adjacent said zone downstream from said group controlled thereby and thereby causing all articles in said group of zones controlled thereby to be moved forward substantially in unison, whereby a gap is created between the trailing article moving in one of said groups and the leading article in the adjacent said group upstream therefrom.

2. The live roller accumulator conveyor combination defined in claim 1 wherein said group of zones is adjacent the downstream end of said conveyor, and further comprising:
    (a) means for stopping an article at said downstream end of said conveyor to initiate accumulation of articles upstream therefrom as defined in claim 1, and
    (b) means for effecting release of such stopped article and initiating operation of said secondary control means as defined in claim 1.

3. The live roller accumulator conveyor combination defined in claim 1 wherein said group of zones is adjacent the downstream end of said conveyor, and further comprising:
    (a) means for stopping an article at said downstream end of said conveyor to initiate accumulation of articles upstream therefrom as defined in claim 1,
    (b) means for effecting release of such stopped article and initiating operation of said secondary control means as defined in claim 1, and
    (c) additional said secondary control means interconnecting said primary control means for a group of other successive said zones and thereby defining a corresponding plurality of consecutive said zone groups, each said secondary control means being operative as defined in claim 1 in response to movement of the stopped article from the most upstream zone in the adjacent group of zones downstream therefrom, whereby a gap is created between the trailing article moving in one of said groups and the leading article in the adjacent said group upstream therefrom.

4. An accumulator conveyor having a plurality of accumulator zones between the inlet and discharge ends thereof, comprising
    at least one article propelling roller rotatably mounted in each said zone for propelling an article therein,
    at least one power transfer device in each said zone rotatably mounted in a housing supported on said conveyor for movement into and out of a position of driving engagement between said friction wheel and said roller in said zone,
    at least one flexible fluid pressure diaphragm engageable with each said housing for moving said housing between a released position in which said friction wheel therein is free of all of said rollers and said driving position thereof,
    means for driving said friction wheels,
    sensor means in each said zone operable by an article on the conveyor,
    valve means actuated by each said sensor means,
    means for supplying fluid under pressure to each said valve means,
    means connecting each said diaphragm with said valve means for said sensor means in the said zone immediately downstream from said zone wherein said diaphragm is located to conduct said fluid to said diaphragm and thereby to move the associated said housing to driving position when the immediately downstream said sensor is released,
    said zones being arranged in groups along said conveyor, and
    means interconnecting said valves of all of said zones of each said group of zones to direct fluid to all of said group of zones to move all of the associated said housings in said group to driving position,
    whereby when said sensor in said zone immediately downstream of one of said groups of zones is released, articles in all of said zones within said group are automatically advanced in unison.

5. The accumulator conveyor combination defined in claim 4 there is a discharge zone downstream of a downstream group of zones and a discharge valve for directing fluid from said fluid supplying means to said diaphragm of said discharge zone to cause selective discharge of an article from said discharge zone, said sensor means of said discharge zone actuating said valve associated therewith when said sensor means of said discharge zone is clear to direct fluid to said diaphragms of all of said downstream group to advance articles in all of said group of zones when said sensor of the discharge zone is clear.

6. The accumulator conveyor combination defined in claim 5 wherein said valve associated with said sensor in said discharge zone is provided with means for discharging fluid from said valves of said downstream group of valves when said sensor in said discharge zone is engaged.

7. The accumulator conveyor combination defined in claim 4 wherein said valve means in the said zone immediately downstream of a specific said zone directs fluid under pressure to said diaphragm of said specific zone when said housing of said specific zone is disposed in driving position, and said valve means associated with said sensor means of the upstream zone of each said group includes means for discharging fluid from said valve means of said zones of said next upstream group when said sensor means of said upstream zone is engaged.

8. The accumulator conveyor combination defined in claim 4 wherein said means interconnecting valves of said zones of each said group includes means connecting the said valve of each said zone downstream of another zone in the same group to said valve of said zone immediately upstream thereof, said valve of the most downstream zone of each of said groups being free of connection to a downstream zone so that said downstream zone is dead until said sensor of the most upstream zone of the next downstream is free.

* * * * *

UNITED STATES PATENT AND TRADEMARK OFFICE
CERTIFICATE OF CORRECTION

PATENT NO. : 4,453,627

DATED : June 12, 1984

INVENTOR(S) : John J. Wilkins

It is certified that error appears in the above-identified patent and that said Letters Patent is hereby corrected as shown below:

Column 8, line 60, "claim 4 there" should be
-- claim 4 wherein there --.

Signed and Sealed this

Twelfth Day of March 1985

[SEAL]

Attest:

DONALD J. QUIGG

Attesting Officer        Acting Commissioner of Patents and Trademarks